Patented May 10, 1932

1,857,541

UNITED STATES PATENT OFFICE

HEINRICH HEIMANN AND PAUL VIRCK, OF DESSAU IN ANHALT, GERMANY, ASSIGNORS TO GENERAL ANILINE WORKS, INC., OF NEW YORK, N. Y., A CORPORATION OF DELAWARE

ARYLATED AMINONAPHTHALENE DERIVATIVES

No Drawing. Application filed November 28, 1927, Serial No. 236,358, and in Germany December 13, 1926.

In German Letters Patent Nos. 122,570, 125,589 and Zeitschrift für Farben- und Textil Chemie 1904, page 57 et seq. has been described the production of arylated aminonaphthalene derivatives by treating aminonaphthalenes or hydroxynaphthalenes with primary amino-aryl-compounds of the benzene series in the presence of a sodium bisulfite solution. It is stated therein that this reaction runs smoothly and gives satisfactory yields of the products desired when using as one component, aminonaphthalene or hydroxynaphthalene-compounds containing in their molecule sulfuric acid or carboxylic acid groups. But when using aminonaphthalenes or hydroxynaphthalenes not substituted by sulfuric acid or carboxylic acid groups the yield is very unsatisfactory (see Zeitschrift für Farben- und Textil Chemie 1904, page 58, and Journal für praktische Chemie II, 75, page 252).

In contradiction to these statements we have found that arylated compounds of aminonaphthalenes may be obtained corresponding to the general formula $$C_{10}H_5Y_{3-m}(NH \cdot C_6H_{5-n}X_n)_m,$$

wherein Y stands for H or any univalent substituent except the groups —COOH, —SO$_3$H and wherein at least one X means the group —OR or

(R, R' and R'' meaning H, alkyl, aryl or substituted aryl) and the other X's mean H or any univalent substituent such as —COOH, —SO$_3$H, —OR,

(R, R', R'' see above) m and n meaning 1 or 2, by heating in the presence of an aqueous solution of a bisulfite salt a naphthalene compound of the general formula

$$C_{10}H_5Y_3$$

in which at least one Y represents the group —OH or —NH$_2$ and the other Y's represent H, halogen, —OR,

(R, R', R'' see above) with an amino compound of the general formula $$H_2N - C_6H_{5-n}X_n$$

wherein n means 1, 2 or 3 and wherein at least one X means —OR or

(R, R', R'' see above) and the other X's mean H or a univalent substituent. The yields are very satisfactory and the products are in a pure state if the reaction is carried out under suitable conditions, namely whilst stirring intensively and at temperatures not considerably below the boiling point of the mixture to not considerably above 150° C. When carrying out the reaction above the boiling point of the reaction mixture a closed vessel must be used; in this case the resulting pressure is a function from the temperature applied and from the tension of the reacting liquid. The treating of the reaction mixture at the temperatures given above is continued until a test prooves that unchanged naphthalene compound applied as starting material is no longer present. It is further of an advantage for obtaining a good yield that the amino benzene compound is used in an excess above the theoretical amount. When using 120–150 per cent. of the theoretical amount of the amino benzene compound the best result is obtained.

The following examples serve to illustrate the invention:

(1) 144 parts of 2-hydroxynaphthalene and 150 parts of 1.2-diaminobenzene are stirred for 40 hours at a temperature of 115–120° C. in a closed enameled vessel with 4000 parts of a solution of sodium bisulfite of 19° Bé. strength. After cooling to 60–70° C. the product of the reaction is separated from the aqueous solution and purified by dissolving in hot water which contains hydrochloric acid. After cooling the (2-aminophenyl)-2-aminonaphthalene-hydrochloride is separated in the form of little needles. By addition of a solution of sodium carbonate the free base is obtained. Recrystallized from dilute alcohol it melts at 96–97° C. From an aqueous solution containing hydrochloric acid it is absorbed by animal fibers on which reddish brown shades are obtained by a treatment with an oxidizing agent.

(2) 144 parts of 2-hydroxynaphthalene and 130 parts 1.3-diaminobenzene are heated to the boiling point for 80 hours, whilst stirring, with 4000 parts of a solution of sodium bisulfite of 19° Bé. strength in a leaded or enamelled vessel provided with a stirrer and a reflux apparatus. The product of reaction is separated from the hot aqueous solution; it may be purified by treating with hot water to which some sodium hydroxide solution is added. It may be recrystallized from a dilute solution of hydrochloric acid.

(3) 137 parts of 1.4-diaminobenzene and 144 parts of 2-hydroxynaphthalene are boiled for 90–100 hours, whilst stirring, with 4000 parts of a solution of sodium bisulfite of 20° Bé. strength in a leaded or enamelled vessel provided with a stirrer, a heating device and a reflux apparatus. After cooling to 60–70° C. the (4-aminophenyl)-2-aminonaphthalene thus obtained is filtered, pressed and well washed with warm water.

When treating the 1-hydroxynaphthalene under the same conditions the (4-aminophenyl)-1-aminonaphthalene is obtained.

(4) In a lead or enamelled vessel provided with a stirrer and a reflux apparatus 288 parts of 1-aminonaphthalene, 400 parts of 4-amino-4'-hydroxydiphenylamine and 7000 parts of a solution of sodium bisulfite of about 20° Bé. strength are boiled whilst stirring until after about 120 hours only small quantities of the unchanged starting materials are present. After cooling to 70–80° C. the product of reaction is separated by filtration, pressed and digested with a very dilute solution of hydrochloric acid and then with hot water to remove the unchanged starting materials.

(5) In a vessel described in Example 3 140 parts of 2-hydroxynaphthalene and 280 parts of 4.4'-diaminodiphenylamine-2-sulfonic acid are boiled with 2000 parts of a solution of sodium bisulfite of 36° Bé. strength and 2000 parts of water for 50–70 hours whilst stirring. The product of condensation is separated by addition of an organic acid. It is a sulfonic acid of 2-naphthylamino-(4'-aminodiphenylamine) of the formula

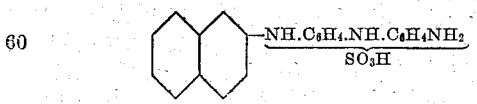

which is purified by dissolving in a dilute solution of sodium carbonate and reseparating by addition of an acid. In an aqueous suspension containing soap it is absorbed by acetate silk which is dyed in blue shades by a subsequent treatment with a weak oxidizing agent.

A corresponding derivative of 1-aminonaphthalene is obtained when applying 1-amino- or 1-hydroxynaphthalene instead of 2-hydroxynaphthalene.

(6) 144 parts of 2-hydroxynaphthalene and 150 parts of 3-amino-1-hydroxybenzene are stirred in a closed enamelled vessel provided with a stirring device with 4000 parts of a solution of sodium bisulfite of 20° Bé. strength for 30 hours at a temperature of 115–120° C. After cooling to 60–70° C. the product of reaction is separated from the solution and purified by boiling repeatedly with water.

(7) 143 parts of 1-aminonathalene and 160 parts of 1-amino-4-hydroxybenzene are stirred at a temperature of 112–115° C. for 40 hours with 4000 parts of a solution of sodium bisulfite of about 20° Bé. strength in a closed enamelled vessel provided with a stirring device. After cooling to 60° C. the (4-hydroxyphenyl)-1-aminonaphthalene thus obtained is filtered, pressed and washed with water. Recrystallized from dilute alcohol it has a melting point at 91° C. It is easily soluble in alcohol, ether and benzene.

(8) In an enamelled closed vessel provided with a heating device 144 parts of 2-hydroxynaphthalene, 160 parts of 4-amino-1-hydroxybenzene and a solution of 400 parts of sodium bisulfite in 6000 parts of water are heated for 12 hours to a temperature of 140–145° C. After cooling to 70° C. the (4-hydroxyphenyl)-2-aminonaphthalene thus obtained is filtered and pressed and washed with hot water. It forms silver-gray needles.

Instead of 2-hydroxynaphthalene the corresponding quantity of 2-aminonaphthalene may be used.

(9) 144 parts of 2-hydroxynaphthalene are heated whilst stirring with 180 parts of 4-amino-1-hydroxy-2-methylbenzene and 6000 parts of solution of sodium bisulfite of 20° Bé. strength at a temperature of 130–135° C. for about 8 hours in an enamelled closed vessel provided with a heating device and with a stirrer. After cooling to 80° C. the product of reaction is filtered, pressed and well washed with hot water. The (4-hydroxy-3-methylphenyl)-2-aminonaphthalene forms in the raw state silver-gray leaflets. Recrystallized from benzene and ligroin it has the melting point at 127–128° C. It is easily soluble in alcohol, benzene and ether.

(10) 144 parts of 2-amino-naphthalene are heated whilst stirring for 10 hours at a temperature of 125–130° C. with 5600 parts of a solution of sodium bisulfite of 15° Bé. strength and 240 parts of the sodium salt of 4-amino-1-hydroxybenzene-2-carboxylic acid. After cooling to 70–80° C. the product of reaction, namely the (4-hydroxyphenyl-3-carboxylic acid)-2-aminonaphthalene is filtered, pressed and washed with hot water. It may be purified by dissolving in a dilute solution of sodium carbonate and precipitating with an acid. It forms a greenish light-gray powder easily soluble in alcohol and ether and melting at 172–174° C.

(11) 160 parts of 2.7-dihydroxynaphthalene, 400 parts of alkali metal bisulfite, 3000 parts of water and 260 parts of 4-amino-1-hydroxybenzene are boiled for about 120 hours in a leaded vessel provided with a stirrer and a reflux apparatus. After cooling to about 70° C. the 2.7-di(para-hydroxyphenylamino)-naphthalene is separated in form of light-gray crystals, it is filtered, pressed and washed with hot water. The dried product obtained in good yield has the melting point at 249–251° C.

(12) 160 parts of 1.5-dihydroxynaphthalene, 260 parts of 4-amino-1-hydroxybenzene, 400 parts of alkali metal bisulfite and 3000 parts of water are heated for 36 hours to a temperature of 115–120° C. in a leaded closed vessel provided with a stirring device. After cooling the separated 1.5-di(para-hydroxyphenylamino)-naphthalene, forming fine needles, is pressed and washed with hot water. The dried compound melts at 278–280° C.

(13) 160 parts of 2.6-dihydroxynaphthalene and 260 parts of 4-hydroxy-1-aminobenzene are boiled with a solution of 400 parts of alkali-metal bisulfite in 3000 parts of water for 120 hours whilst stirring in an enamelled vessel provided with a stirring device and a reflux apparatus. After cooling to about 80° C. the product of reaction is filtered off, pressed and washed with hot water. It is recrystallized from dilute alcohol. The 2.6-di(4-hydroxyphenylamino)-naphthalene forms a greenish gray powder melting at 274–278° C. In a similar way other dihydroxy-, diamino or aminohydroxynaphthalene-derivatives may be employed.

(14) 100 parts of 1.4-diaminobenzene and 100 parts of 2.7-dihydroxynaphthalene are boiled in an enamelled vessel provided with a stirrer and a reflux apparatus with a solution of 400 parts of alkali metal bisulfite and 3000 parts of water for 40 hours. After cooling to 70–80° C. the product of reaction is filtered off, pressed and washed with hot water. The 2-(4-aminophenylamino)-7-hydroxynaphthalene is purified from small quantities of by-products by dissolving in a dilute warm solution of sodium hydroxide and by precipitating from this solution with hydrochloric acid. This process of purification may be repeated. From a solution containing hydrochloric acid the 2(4-aminophenylamino)-7-hydroxynaphthalenehydrochloride is separated by addition of common salt. In the dry state it forms a bluish gray powder which dissolves in water made weakly acid by addition of hydrochloric acid. From this solution it is absorbed by animal fibers; by a subsequent treatment with an oxidizing agent these fibers are dyed in fast blue tints.

It is obvious to those skilled in the art that our present invention is not limited to the foregoing examples or to the details given therein. Thus, for instance, the hydroxynaphthalenes chosen in the examples may be substituted by the corresponding aminonaphthalenes and vice versa. Furthermore other aminobenzene-derivatives substituted in the manner mentioned above may be employed. It may be stated that instead of sodium bisulfite other soluble bisulfite salts may be used. It is advantageous when employing a more dilute solution of soluble bisulfite salt to heat to a higher temperature, and when employing a more concentrated solution to heat only nearly to the boiling point of the reaction mixture. The aminobenzene compound employed in an excess may be recovered and re-used.

What we claim is:

1. The process which comprises treating a naphthalene compound of the general formula

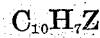

in which Z represents the group —OH or —NH$_2$, with 1-amino-4-hydroxybenzene, while agitating, in the presence of an aqueous solution of a bisulfite salt at a temperature between about 100° C. and about 145° C.

2. The process which comprises treating a naphthalene compound of the general formula

in which Z represents the group —OH or —NH$_2$, with 1-amino-4-hydroxybenzene, while agitating, in the presence of an aqueous solution of a bisulfite salt at a temperature between about 100° C. and about 145° C.

3. The process which comprises treating a naphthalene compound of the general formula

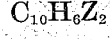

in which one Z represents the group —OH or —NH$_2$ and the other Z represents H, —OH or —NH$_2$ with an amino compound of the general formula

wherein $n$ means 1 or 2, and wherein one X means —OH and the other X may be H, methyl, or a carboxylic acid group, while agitating in the presence of an aqueous solution of a bisulfite salt at a temperature between about 100° C. and about 145° C.

4. The process which comprises treating a naphthalene compound of the general formula $$C_{10}H_7Z,$$

in which Z represents the group —OH or —NH$_2$, with an amino compound of the general formula $$H_2N—C_6H_{5-n}X_n$$

wherein $n$ means 1 or 2, and wherein one X means —OH and the other X may be H, methyl, or a carboxylic acid group, while agitating in the presence of an aqueous solution of a bisulfite salt at a temperature between about 100° C. and about 145° C.

5. The process which comprises treating a naphthalene compound of the general formula

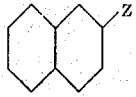

in which Z represents the group —OH or —NH$_2$, with an amino compound of the general formula $$H_2N—C_6H_{5-n}X_n,$$

wherein $n$ means 1 or 2, and wherein one X means —OH and the other X may be H, methyl, or a carboxylic acid group, while agitating in the presence of an aqueous solution of a bisulfite salt at a temperature between about 100° C. and about 145° C.

6. The process which comprises treating a naphthalene compound of the general formula $$C_{10}H_7Z,$$

in which Z represents the group —OH or —NH$_2$, with an amino compound of the general formula $$H_2N—C_6H_4—OH,$$

while agitating in the presence of an aqueous solution of a bisulfite salt at a temperature between about 100° C. and about 145° C.

7. The process which comprises treating a naphthalene compound of the general formula

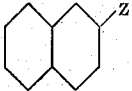

in which Z represents the group —OH or —NH$_2$, with an amino compound of the general formula $$H_2N—C_6H_4—OH,$$

while agitating in the presence of an aqueous solution of a bisulfite salt at a temperature between about 100° C. and about 145° C.

8. The process which comprises treating 2-hydroxynaphthalene with 1-amino-4-hydroxybenzene, while agitating, in the presence of an aqueous solution of a bisulfite salt at a temperature between about 100° C. and about 145° C.

9. The process which comprises treating 2-hydroxynaphthalene with 4-amino-1-hydroxybenzene-2-carboxylic acid, while agitating, in the presence of an aqueous solution of a bisulfite salt at a temperature between about 100° C. and about 145° C.

10. The process which comprises treating 2-hydroxynaphthalene with 4-amino-1-hydroxy-2-methylbenzene, while agitating, in the presence of an aqueous solution of a bisulfite salt at a temperature between about 100° C. and about 145° C.

In testimony whereof, we affix our signatures.

HEINRICH HEIMANN.
PAUL VIRCK.